(No Model.)
F. F. LANDIS.
CENTRIFUGAL DISCHARGER FOR STRAW STACKERS.
No. 517,524. Patented Apr. 3, 1894.
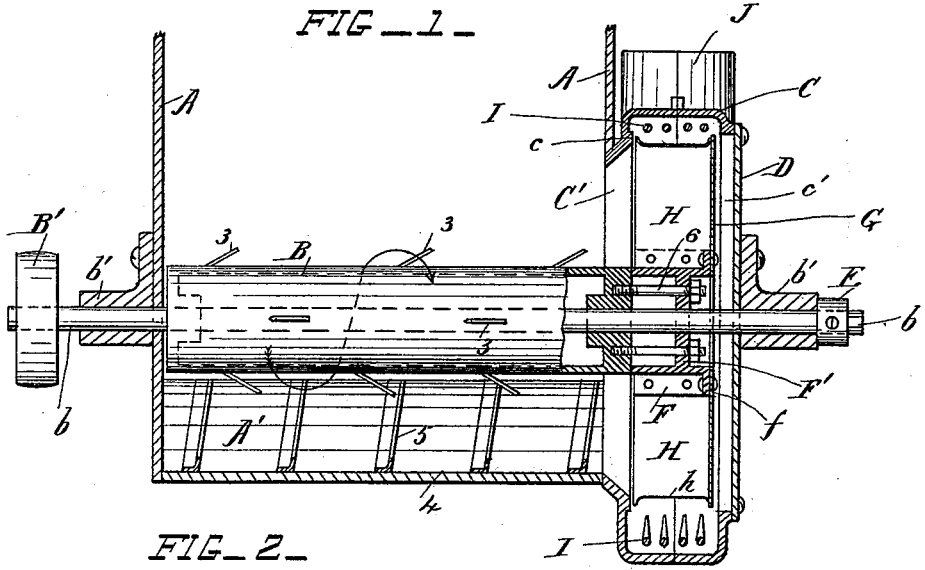
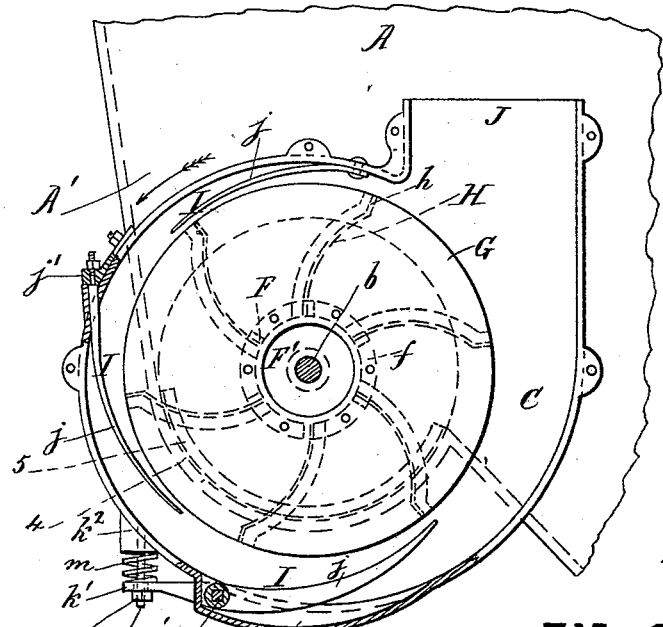
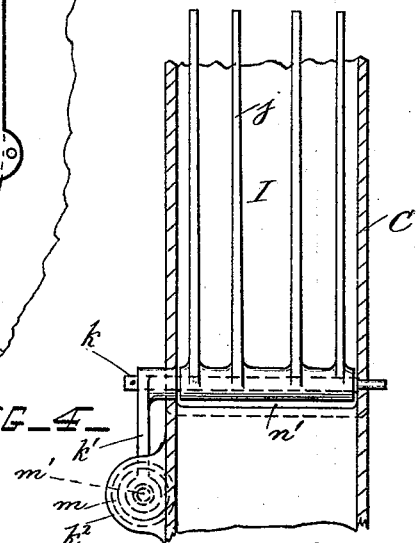
WITNESSES
Jno. F. Doran Jr.
George N. Bliss, Jr.
INVENTOR
Frank F. Landis.
by Herbert W. T. Jenner.
Attorney

UNITED STATES PATENT OFFICE.

FRANK F. LANDIS, OF WAYNESBOROUGH, PENNSYLVANIA.

CENTRIFUGAL DISCHARGER FOR STRAW-STACKERS.

SPECIFICATION forming part of Letters Patent No. 517,524, dated April 3, 1894.

Application filed November 21, 1893. Serial No. 491,528. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Centrifugal Dischargers for Straw-Stackers; and I do hereby declare the following to be a full, clear, and exact description of the invention, such as will enable others skilled in the art to which it appertains to make and use the same.

This invention relates to centrifugal dischargers used in thrashing machines in connection with the pneumatic straw elevator; and it consists in the novel construction and combination of the parts hereinafter fully described and claimed.

In the drawings: Figure 1 is a sectional end view of the discharger showing a portion of the separator casing. Fig. 2 is a side view of the discharger with one half of its casing removed. Fig. 3 is a cross-section through one of the discharger arms. Fig. 4 is a detail plan view of one of the straw guides.

A are portions of the casing of a grain separator, which form a chamber A' into which the straw passes after the grain has been removed from it.

B is a barrel secured on the shaft $b$, which is journaled in the bearings $b'$ and revolved by the belt pulley B'. The barrel may be cylindrical or it may be conical, and it may also have projections 3 on its periphery, but these projections are not absolutely essential. The projections may be of any approved form, and they may be radial to the shaft $b$, or they may be inclined as shown. The projections may be arranged in straight rows or spiral rows. The portion 4 of the chamber A' which is substantially concentric with the shaft $b$ is provided with spirally arranged ribs 5, formed of angle iron or other approved material. The barrel, when revolved, causes the straw and air to revolve inside the chamber, the surface of the barrel being in frictional contact with them; and the projections, when used, also assist in revolving the straw. The series of ribs 5 propel the revolving straw toward the discharger casing.

C is the discharger casing secured to the side of the separator casing. The discharger casing is provided with a conical inlet C' connecting it with the straw chamber, and $c$ is a projecting lip forming a ring inside the casing in close proximity to the blades or arms of the discharger.

J is the outlet pipe which is connected to the stacker. The discharger casing is preferably formed in halves secured together in any approved manner.

D is a plate for closing the opening $c'$ through which the discharger is inserted.

E is a collar secured on the discharger shaft $b$. This collar runs against the end of the shaft bearing and prevents the discharger arms or blades from touching the lip $c$, but permits them to be moved away from it. The pressure of the air behind the discharger inside the casing normally holds the discharger pressed toward the said lip.

The discharger consists of a plate or disk G provided with arms or blades H. The discharger is secured upon the shaft $b$. This is preferably accomplished by forming ribs F upon the periphery of a hub F' and a circular flange $f$ on its end. The disk G is riveted to the flange $f$, and the ends of the arms H are riveted to the ribs F. The hub F' may be secured direct to the shaft $b$, but it is preferably secured to the barrel B by the longitudinal bolts 6 so that it can easily be removed from its casing.

The arms H are curved rearwardly in the opposite direction from their direction of revolution, which is indicated by the arrow. The tips $h$ of the arms are bent forward of the general rearward direction of the arms and are substantially radial to the shaft $b$. The arms are channel-shaped in cross-section, and consist of a portion $g$ arranged at right angles to the disk G, portions $g'$ parallel with the disk G, and curved portions $i$ uniting the said portions $g$ and $g'$. One of the portions $g'$ is riveted to the disk G, but, if desired, the arms may be formed integral with the disk and the disk may be integral with its hub.

I are the straw guides arranged inside the discharger casing. These guides preferably consist of curved fingers $j$. The fingers are arranged in rows inside the discharger casing. Each row of fingers forms a guide, and as many guides as desired may be used. The guides may be attached to the casing in any approved manner. The fingers point in the direction of the revolution of the discharger, and their tips are arranged so as to just clear the tips $h$ of the arms. The guides may be formed of steel or other elastic material and secured direct to the casing, or they may be formed by securing a row of fingers to a bracket $j'$. The fingers are passed through holes in the discharger casing, and the bracket is then bolted to the outside of the casing. This construction permits the guides to be removed without opening the discharger casing. The guides are preferably provided with actuating springs instead of being springs themselves, and they may be formed in many ways upon either plan of spring guides or spring-actuated guides, and several different kinds of guides may be used in the same casing if desired. A single guide of either kind may also be used, or guides may be dispensed with altogether.

When spring-actuated guides are used, they are preferably constructed as shown in detail in Fig. 4. The guide, or guide fingers, is secured upon a shaft $k$ which is journaled in bearings in the casing. The shaft $k$ is preferably square, and an arm $k'$ is secured upon its projecting end. A spring $m$ is arranged about the pin $m'$ between the end of the arm $k'$ and a boss $k^2$ on the casing, and $n$ is a nut or collar on the end of the pin $m'$. The pin passes through a hole in the end of the arm, and the nut forms a stop which prevents the guide from striking the discharger arms. The discharger casing is preferably provided with a recess $n'$ for the guide to work in.

The operation of the discharger is as follows: The straw is fed to the inlet $C'$ by the barrel and the spiral ribs, and is then forced up the outlet pipe by the centrifugal action of a revolving discharger. The straw is caught by the channel-shaped curved arms and is flung off by them, and is kept in motion by the blast of air blown off with the straw by the discharger. The guides prevent the straw from packing around the periphery of the discharger casing, and the forwardly bent tips $h$ of the arms scrape the straw off the guides and prevent it from accumulating on the guides. The guides spring back when bunches of straw come between them and the arms, so that the discharger does not become choked. The discharger moves away from the lip $c$ when a bunch of straw strikes it with sufficient force. This lateral motion permits the straw to pass between the edges of the arms and the lip, and the discharger resumes its original position automatically as soon as the bunch of straw has been discharged.

What I claim is—

1. The combination, with a revoluble discharger consisting of a disk provided with arms; and a casing inclosing the discharger, of a yielding straw guide connected at one end to the said casing and projecting therein in the direction of the motion of the discharger, and operating to prevent the straw from becoming packed between the tips of the arms and the casing, substantially as set forth.

2. The combination, with a revoluble discharger consisting of a disk provided with arms; and a casing inclosing the discharger, of a straw guide consisting of a row of fingers arranged inside the said casing, substantially as shown and described.

3. The combination, with a revoluble discharger consisting of a disk provided with arms; and a casing inclosing the discharger, of a straw guide consisting of a row of spring-actuated fingers pivotally connected to the casing and provided with a stop whereby the said guide is prevented from striking the discharger arms, substantially as set forth.

4. The combination, with a revoluble discharger consisting of a disk provided with arms; and a casing inclosing the said discharger, of a straw guide consisting of a row of fingers, a shaft journaled in the casing and having the said fingers secured on it, an arm secured on the projecting end of the shaft, a spring operating the said arm and pressing the fingers toward the discharger, and a stop for limiting the motion of the fingers toward the discharger, substantially as set forth.

5. The combination, with a straw discharger consisting of a revoluble disk provided with a series of rearwardly-curved arms having substantially radial tips, of an inclosing casing, and a yielding straw guide connected to the casing and operating to prevent the straw from becoming packed between the tips of the arms and the casing, substantially as set forth.

6. The combination, with a straw discharger consisting of a revoluble disk provided with a series of rearwardly-curved arms having channel-shaped faces and substantially radial tips; of an inclosing casing, and a yielding straw guide connected to the casing and operating to prevent the straw from becoming packed between the tips of the arms and the casing, substantially as set forth.

7. The combination, with a straw discharger consisting of a disk provided with arms; and the discharger shaft and casing; of a straw chamber opening into the discharger casing and provided with a curved portion substantially concentric with the said shaft; means for revolving the straw in the straw chamber, and a series of spirally arranged ribs secured to the said curved portion, whereby the revolving straw is propelled toward the discharger, substantially as set forth.

In testimony whereof I affix my signature in presence of two witnesses.

FRANK F. LANDIS.

Witnesses:
ALF. N. RUSSELL,
H. H. LEIDIG.